US009609017B1

(12) United States Patent
Gilbert et al.

(10) Patent No.: US 9,609,017 B1
(45) Date of Patent: Mar. 28, 2017

(54) METHODS FOR PREVENTING A DISTRIBUTED DENIAL SERVICE ATTACK AND DEVICES THEREOF

(71) Applicant: F5 Networks, Inc., Seattle, WA (US)

(72) Inventors: Daniel Thomas Gilbert, Seattle, WA (US); Nathan Meyer, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 13/770,779

(22) Filed: Feb. 19, 2013

Related U.S. Application Data

(60) Provisional application No. 61/600,943, filed on Feb. 20, 2012.

(51) Int. Cl.
*H04L 29/06* (2006.01)
*H04L 29/08* (2006.01)

(52) U.S. Cl.
CPC .... *H04L 63/1458* (2013.01); *H04L 29/08288* (2013.01); *H04L 67/1029* (2013.01)

(58) Field of Classification Search
CPC ........... H04L 29/08288; H04L 67/1029; H04L 67/1036; H04L 47/125; H04L 47/726; H04L 63/1458
USPC .................................... 726/22; 709/224, 229
See application file for complete search history.

(56) References Cited

U.S. PATENT DOCUMENTS

| | | | |
|---|---|---|---|
| 5,958,053 A | 9/1999 | Denker | |
| 6,119,234 A | 9/2000 | Aziz et al. | |
| 6,839,850 B1 * | 1/2005 | Campbell et al. | 726/23 |
| 7,028,182 B1 | 4/2006 | Killcommons | |
| 7,299,491 B2 | 11/2007 | Shelest et al. | |
| 7,441,429 B1 | 10/2008 | Nucci et al. | |
| 7,620,733 B1 | 11/2009 | Tzakikario et al. | |
| 7,921,211 B2 | 4/2011 | Larson et al. | |
| 7,941,517 B2 | 5/2011 | Migault et al. | |
| 8,266,427 B2 | 9/2012 | Thubert et al. | |
| 8,281,383 B2 | 10/2012 | Levy-Abegnoli et al. | |
| 8,289,968 B1 | 10/2012 | Zhuang | |
| 8,347,100 B1 | 1/2013 | Thornewell et al. | |
| 8,856,898 B1 | 10/2014 | Thornewell et al. | |
| 9,106,699 B2 | 8/2015 | Thornewell et al. | |
| 2002/0103916 A1 | 8/2002 | Chen et al. | |

(Continued)

OTHER PUBLICATIONS

Bagnulo et al., "DNS 64: DNS extensions for Network Address Translation from IPv6 Clients to IPv4 Servers," Internet draft, Jul. 2010, pp. 1-31, IETF Trust.

(Continued)

*Primary Examiner* — Hadi Armouche
*Assistant Examiner* — Angela Holmes
(74) *Attorney, Agent, or Firm* — LeClairRyan, a Professional Corporation

(57) ABSTRACT

A method, non-transitory computer readable medium and global traffic manager computing device for preventing distributed denial of service attack comprising machine executable code which when executed by at least one processor, causes the processor to perform steps including obtaining network information relating to a request in response to receiving the request. A rating is determined for the obtained network information based on one or more network parameters. An action to be taken for the received request is determined based on a comparison of the determined rating and a threshold rating. The determined action is executed for the received request.

17 Claims, 2 Drawing Sheets

(56) References Cited

U.S. PATENT DOCUMENTS

| | | | |
|---|---|---|---|
| 2003/0074434 A1 | 4/2003 | Jason et al. | |
| 2003/0221000 A1 | 11/2003 | Cherkasova et al. | |
| 2005/0028010 A1 | 2/2005 | Wallman | |
| 2005/0125195 A1 | 6/2005 | Brendel | |
| 2006/0288413 A1 | 12/2006 | Kubota | |
| 2007/0214503 A1 | 9/2007 | Shulman et al. | |
| 2008/0137659 A1 | 6/2008 | Levy-Abegnoli et al. | |
| 2008/0205415 A1 | 8/2008 | Morales | |
| 2008/0271132 A1 | 10/2008 | Jokela et al. | |
| 2008/0304457 A1 | 12/2008 | Thubert et al. | |
| 2009/0187649 A1 | 7/2009 | Migault et al. | |
| 2009/0271865 A1 | 10/2009 | Jiang | |
| 2010/0034381 A1 | 2/2010 | Trace et al. | |
| 2010/0036959 A1 | 2/2010 | Trace et al. | |
| 2010/0061380 A1 | 3/2010 | Barach et al. | |
| 2010/0077462 A1 | 3/2010 | Joffe et al. | |
| 2010/0142382 A1 | 6/2010 | Jungck et al. | |
| 2010/0217890 A1 | 8/2010 | Nice et al. | |
| 2010/0228813 A1 | 9/2010 | Suzuki et al. | |
| 2010/0274885 A1* | 10/2010 | Yoo | H04L 67/1002 709/224 |
| 2010/0325264 A1 | 12/2010 | Crowder et al. | |
| 2011/0038377 A1 | 2/2011 | Haddad | |
| 2011/0055921 A1 | 3/2011 | Narayanaswamy et al. | |
| 2011/0154132 A1 | 6/2011 | Aybay | |
| 2011/0211553 A1 | 9/2011 | Haddad | |
| 2011/0282997 A1 | 11/2011 | Prince et al. | |
| 2011/0283018 A1 | 11/2011 | Levine et al. | |
| 2011/0292857 A1 | 12/2011 | Sarikaya et al. | |
| 2011/0307629 A1 | 12/2011 | Haddad | |
| 2012/0005372 A1 | 1/2012 | Sarikaya et al. | |
| 2012/0047571 A1 | 2/2012 | Duncan et al. | |
| 2012/0054497 A1 | 3/2012 | Korhonen | |
| 2012/0059934 A1 | 3/2012 | Rafiq et al. | |
| 2012/0071131 A1 | 3/2012 | Zisapel et al. | |
| 2012/0110210 A1 | 5/2012 | Huang et al. | |
| 2012/0117379 A1 | 5/2012 | Thornewell et al. | |
| 2012/0174217 A1 | 7/2012 | Ormazabal | |
| 2012/0259998 A1 | 10/2012 | Kaufman | |
| 2012/0284296 A1 | 11/2012 | Arifuddin et al. | |
| 2013/0007870 A1* | 1/2013 | Devarajan et al. | 726/11 |
| 2013/0100815 A1 | 4/2013 | Kakadia et al. | |
| 2013/0103805 A1 | 4/2013 | Lyon | |
| 2013/0151725 A1 | 6/2013 | Baginski et al. | |
| 2013/0166715 A1 | 6/2013 | Yuan et al. | |
| 2013/0201999 A1 | 8/2013 | Savolainen et al. | |
| 2013/0205035 A1 | 8/2013 | Chen | |
| 2013/0205040 A1 | 8/2013 | Naor et al. | |
| 2013/0335010 A1 | 12/2013 | Wu et al. | |
| 2013/0340079 A1 | 12/2013 | Gottlieb et al. | |

OTHER PUBLICATIONS

Bau et al., "A Security Evaluation of DNSSEC with NSEC3," Mar. 2, 2010; updated version corrects and supersedes a paper in the NDSS' 10 proceedings, pp. 1-18.

F5 Networks, Inc., "BIG-IP Global Traffic Manager and Big-IP Link Controller: Implementations," Manual 0304-00, Dec. 3, 2009, pp. 1-161, version 10.1, F5 Networks, Inc.

F5 Networks, Inc., "BIG-IP Systems: Getting Started Guide," Manual 0300-00, Feb. 4, 2010, pp. 1-102, version 10.1, F5 Networks, Inc.

F5 Networks, Inc., "Detail Requirement Report: RQ-GTM-0000024," <http://fpweb/fptopic.asp?REQ=RQ-GTM-0000024>, F5 Networks, Inc., 1999, printed Mar. 31, 2010, 2 pages.

F5 Networks, Inc., "Detail Requirement Report: RQ-GTM-0000028," <http://fpweb/fptopic.asp?REQ=RQ-GTM-0000028>, F5 Networks, Inc., 1999, printed Mar. 31, 2010, 2 pages.

F5 Networks, Inc., "DNS DDOS Protection Functional Spec," BigipDNSDDOSProtectionFS<TMO<TWiki, last accessed Mar. 31, 2010, pp. 1-2.

F5 Networks, Inc., "DNSSEC Functional Spec," TMOSDnsSECFS<TMOS<TWiki, last accessed on Mar. 31, 2010, pp. 1-10.

F5 Networks, Inc.,"DNS Security (DNSSEC) Solutions," <http://www.f5.com/solutions/security/dnssec>, printed Aug. 23, 2010, pp. 1-4.

Xelerance, "DNSX; DNSX Secure Signer; DNSSEC Management Solution," <http://www.xelerance.com/dnssec>.pp. 1-9, Aug. 2009.

F5 Networks, Inc., "F5 and Infoblox Provide Customers with Complete DNS Security Solution," <http://www.f5.com/news-press-events/press/2010/20100301.html>, Mar. 1, 2010, 2 pages, F5 Networks, Inc., Seattle and Santa Clara, California.

F5 Networks, Inc., "F5 Solutions Enable Government Organizations to Meet 2009 DNSSEC Compliance," .<http://www.f5.com/news-press-events/press/2009/20091207.html>, Dec. 7, 2009, 2 pages, F5 Networks, Inc., Seattle, California.

Forrester Consulting, "DNSSEC Ready for Prime Time," White Paper, Jul. 2010, pp. 1-23, Forrester Research, Inc., Cambridge, Maine.

Higgins, Kelly Jackson, "Internet Infrastructure Reaches Long-Awaited Security Milestone," Dark Reading, Tech Center: Security Services, <http//www.darkreading.com/securityservices/security/management/showArticle.jhtml?article>, Jul. 28, 2010. pp. 1-4.

Howarth, Fran, "Investing in security versus facing the consequences," White Paper by Bloor Research, Sep. 2010, pp. 1-15.

Kaminsky, Dan, "Black Ops of Fundamental Defense: Introducing the Domain Key Infrastructure," <http://www.slideshare.net/RecursionVentures/dki-2>, Aug. 2010, slides 1-116.

Laurie et al., "DNS Security (DNSSEC) Hashed Authenticated Denial of Existence," Network Working Group, RFC 5155, Feb. 2008, pp. 1-51.

Macvittie, Lori, "It's DNSSEC Not DNSSUX," DevCentral>Weblogs, <http://devcentral.f5.com/weblogs/macvittie/archive/2009/11/18/itrsquos-dnssec-not-dnssux.aspx>, posted on Nov.18, 2009, accessed on Jul. 6, 2010, pp. 3-7.

F5 Networks, Inc., "PDR/CDR for RQ-GTM-0000028," BigipDNSDDOSProtectionPDR<TMOS<TWiki, last accessed on Mar. 31, 2010, pp. 1-14.

Silva, Peter, "DNSSEC: The Antidote to DNS Cache Poisoning and Other DNS Attacks," F5 Technical Brief, 2009, pp. 1-10.

Thomson et al., "DNS Extensions to Support IP Version 6," The Internet Society, Network Working Group, RFC 3596, Oct. 2003, pp. 1-8.

Wikipedia, "Domain Name System Security Extensions," <http://en.wikipedia.org/wiki/DNSSEC>, accessed Jun. 3, 2010, pp. 1-20.

Wikipedia, "IPv6", <http://en.wikipedia.org/wiki/IPv6>, accessed Jun. 3, 2010, 1 page.

Wikipedia, "List of DNS record types," <http://en.wikipedia.org/wiki/List_of_DNS_record_types>, Jun. 2010, pp. 1-6.

Secure64, "Secure64 DNS Signer", <http://www.secure64.com>, Data sheet, Jun. 22, 2011, V.3.1., 2 pages.

Xelerance, "Who is Xelerance", <http://www.xerlerance.com>, Jul. 20, 2007, slides 1-17.

Arends R., et al., "DNS Security Introduction and Requirements", Network Working Group, RFC 4033, Mar. 2005, pp. 1-20.

Arends R., et al., "Protocol Modifications for the DNS Security Extensions", Network Working Group, RFC 4035, Mar. 2005, pp. 1-50.

Arends R., et al., "Resource Records for the DNS Security Extensions", Network Working Group, RFC 4034, Mar. 2005, pp. 1-28.

Aura T., "Cryptographically Generated Addresses (CGA)", Network Working Group, RFC 3972, Mar. 2005, pp. 1-21.

Carpenter, B., "Transmission of IPv6 over IPv4 Domains without Explicit Tunnels", Network Working Group, RFC 2529, Mar. 1999, pp. 1-10.

Eastlake D., "Domain Name System Security Extensions", Network Working Group, RFC 2535, Mar. 1999, pp. 1-44.

Tatipamula M., et al., "IPv6 Integration and Coexistence Strategies for Next-Generation Networks", IEEE Communications Magazine, Jan. 2004, pp. 88-96.

Kaminsky, D., "Black Ops of Fundamental Defense", Recursion Ventures, 2010, pp. 1-116, (www.recursion.com).

(56) References Cited

OTHER PUBLICATIONS

Hagino J., et al., "An IPv6-to-IPv4 Transport Relay Translator", Network Working Group, RFC 3142, Jun. 2001, pp. 1-11.

* cited by examiner

METHODS FOR PREVENTING A DISTRIBUTED DENIAL SERVICE ATTACK AND DEVICES THEREOF

This application claims the benefit of U.S. Provisional Patent Application Ser. No. 61/600,943 filed Feb. 20, 2012, which is hereby incorporated by reference in its entirety.

FIELD

This technology generally relates application security and, more particularly, relates to methods, non-transitory computer readable medium and devices for preventing a distributed denial of service attack.

BACKGROUND

A denial of service attack (DoS attack) or distributed denial of service attack (DDoS attack) is an attempt to make computer or a network resource unavailable to its intended users.

Denial of service attack seek to consume computing or network resources by sending queries to a DNS infrastructure which then responds to a third party's site causing slowing or lack of availability. It is trivial for an attacker to spoof the destination address in packets. This situation is exacerbated by the fact that using DNSSec to sign responses is more resource intensive than issuing unsigned responses and that it would be trivial to fill smaller internet connections with bogus requests to sites which have DNSSec enabled, such as .gov or .mil.

SUMMARY

A method for preventing distributed denial of service attack includes a global traffic manager computing device obtaining network information relating to a request in response to receiving the request. A rating is determined for the obtained network information by the global traffic manager computing device based on one or more network parameters. An action to be taken for the received request is determined by the global traffic manager computing device based on a comparison of the determined rating and a threshold rating. The determined action is executed by the global traffic manager computing device.

A non-transitory computer readable medium having stored thereon instructions for preventing distributed denial of service attack comprising machine executable code which when executed by at least one processor, causes the processor to perform steps including obtaining network information relating to a request in response to receiving the request. A rating is determined for the obtained network information based on one or more network parameters. An action to be taken for the received request is determined based on a comparison of the determined rating and a threshold rating. The determined action is executed for the received request.

An global traffic manager computing device to prevent distributed denial of service attack includes configurable logic and a memory device coupled to one or more processors, at least one of the one or more processors configured to execute programmed instructions stored in the memory device including or the configurable logic configured to implement obtaining network information relating to a request in response to receiving the request. A rating is determined for the obtained network information based on one or more network parameters. An action to be taken for the received request is determined based on a comparison of the determined rating and a threshold rating. The determined action is executed for the received request.

This technology provides a number of advantages including providing effective methods, non-transitory computer readable medium and devices for preventing distributed denial of service attacks and mitigating the potential damage done by a DNS amplification attack. Additionally, this technology helps to mitigate DNS attacks at a reduced cost and with fewer monitoring resources.

DETAILED DESCRIPTION

Figure 1:
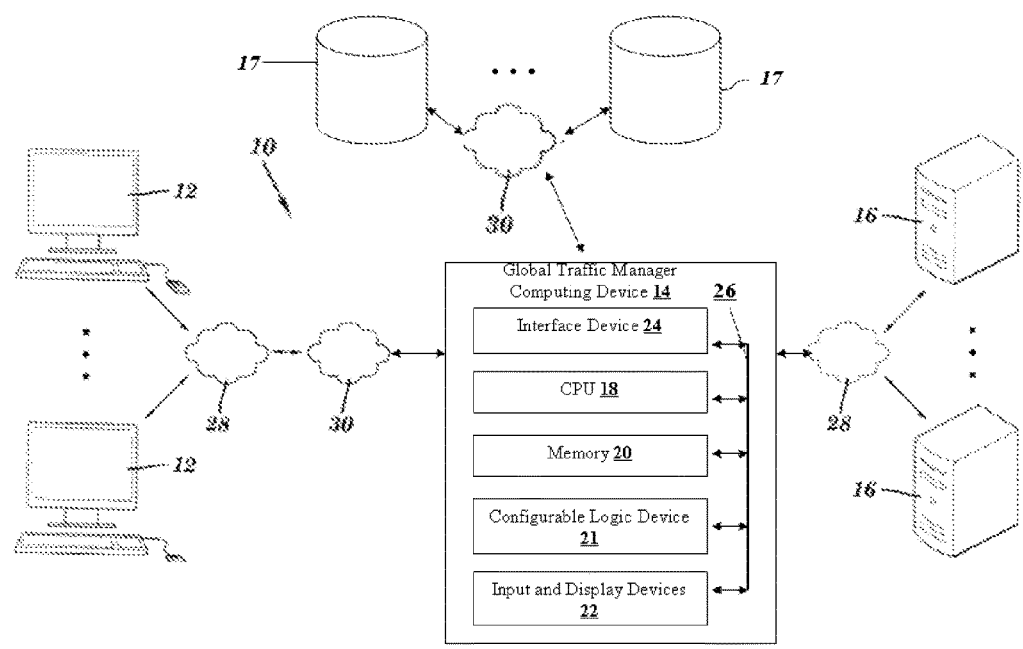
FIG. 1 is a block diagram of an exemplary network environment with an global traffic manager computing device for preventing distributed denial of service attack.

An exemplary network environment 10 with a global traffic manager computing device 14 for preventing distributed denial service attack is illustrated in FIG. 1. The exemplary environment 10 includes plurality of client computing devices 12, the global traffic manager computing device 14, plurality of servers 16 and a plurality of domain name system (DNS) servers 17 which are coupled together by local area networks (LANs) 28 and wide area network (WAN) 30, although the environment can include other types and numbers of devices, components, elements and communication networks in other topologies and deployments. While not shown, the exemplary environment 10 may include additional network components, such as routers, switches and other devices, which are well known to those of ordinary skill in the art and thus will not be described here. This technology provides a number of advantages including providing effective methods, non-transitory computer readable medium and devices for preventing distributed denial of service attacks and mitigating the potential damage done by a DNS amplification attack.

Referring more specifically to FIG. 1, the global traffic manager computing device 14 is coupled to client computing devices 12 through one of the LANs 28, although the client computing devices 12 and global traffic manager computing device 14 may be coupled together via other topologies. Additionally, the global traffic manager computing device 14 is coupled to the servers 16 through the WAN 30 and another one of the LANs 28, although the servers 16 and global traffic manager computing device 14 may be coupled together via other topologies. Further, the global traffic manager computing device 14 is coupled to the plurality of DNS servers 17 through the WAN 30, although the DNS servers 17 and the global traffic manager computing device 14 can be coupled together via other topologies.

The global traffic manager computing device 14 assists with preventing distributed denial service attack as illustrated and described with the examples herein, although global traffic manager computing device 14 may perform other types and numbers of functions. The global traffic manager computing device 14 includes at least one processor 18, memory 20, optional configurable logic device 21, input and display devices 22, and interface device 24 which are coupled together by bus 26, although global traffic manager computing device 14 may comprise other types and numbers of elements in other configurations.

Processor(s) 18 may execute one or more computer-executable instructions stored in the memory 20 for the methods illustrated and described with reference to the examples herein, although the processor(s) can execute other types and numbers of instructions and perform other types and numbers of operations. The processor(s) 18 may comprise one or more central processing units ("CPUs") or general purpose processors with one or more processing cores, such as AMD® processor(s), although other types of processor(s) could be used (e.g., Intel®).

Figure 2:
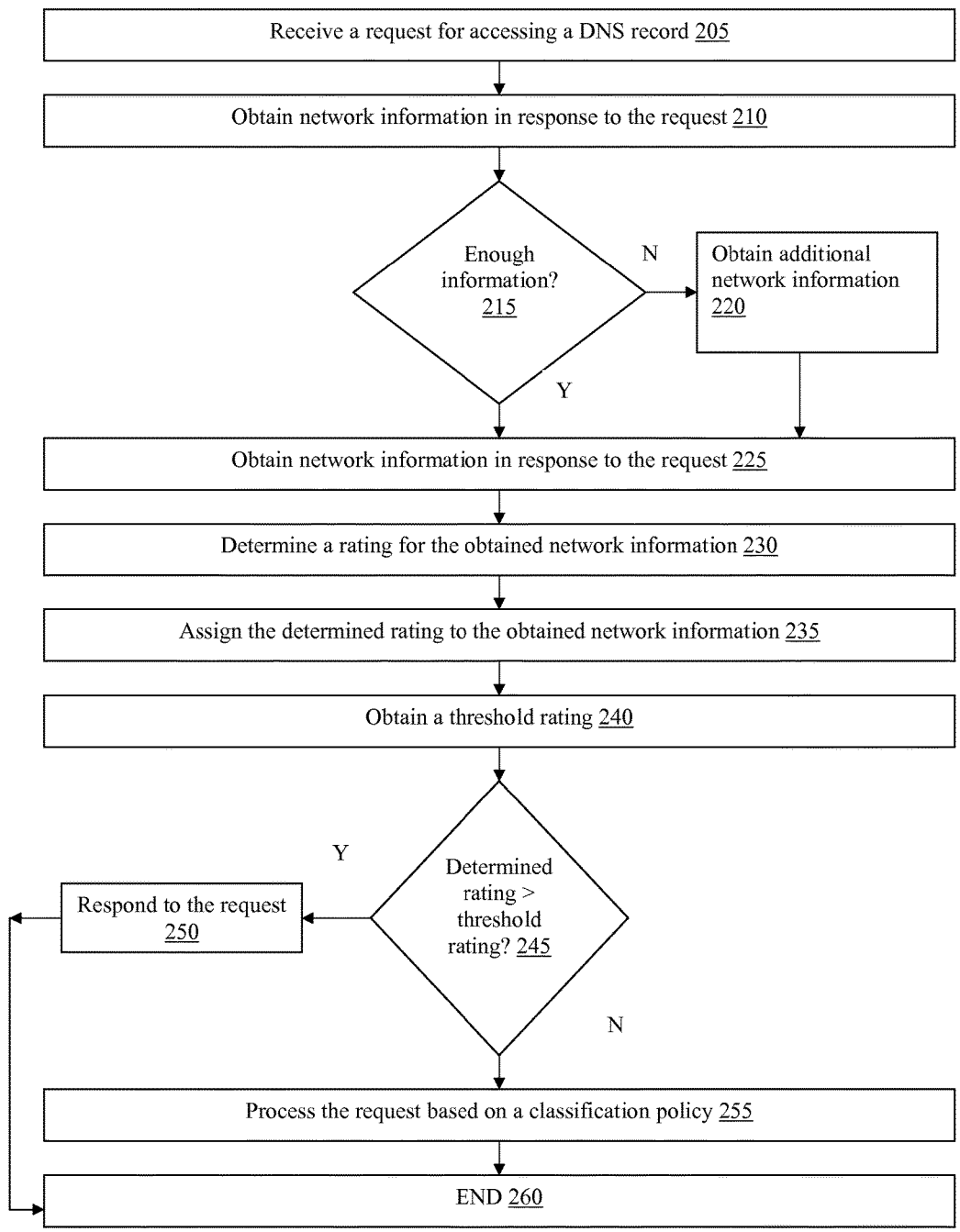
FIG. 2 is a flowchart of an exemplary method for preventing distributed denial of service attack.

Memory 20 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. Memory 20 may store one or more programmed instructions of this technology as illustrated and described with reference to the examples herein that may be executed by the one or more processor(s) 18. The flow chart shown in FIG. 2 is representative of example steps or actions of this technology that may be embodied or expressed as one or more programmed instructions stored in memory 20 that may be executed by the processor(s) 18 and/or may be implemented by configured logic in the optional configurable logic device 21.

The configurable logic device 21 may comprise specialized hardware configured to implement one or more steps of this technology as illustrated and described with reference to the examples herein. By way of example only, the optional configurable logic device 21 may comprise one or more of field programmable gate arrays ("FPGAs"), field programmable logic devices ("FPLDs"), application specific integrated circuits (ASICs") and/or programmable logic units ("PLUs").

Input and display devices 22 enable a user, such as an administrator, to interact with the global traffic manager computing device 14, such as to provide inputs to define a threshold rating, input and/or view data and/or to configure, program and/or operate it by way of example only. Input devices may include a keyboard and/or a computer mouse and display devices may include a computer monitor, although other types and numbers of input devices and display devices could be used.

The interface device 24 in the global traffic manager computing device 14 is used to operatively couple and communicate between the global traffic manager computing device 14 and the client computing devices 12 the servers 16 which are all coupled together by one or more of the local area networks (LAN) 28 and/or the wide area network (WAN) 30, although other types and numbers of communication networks or systems with other types and numbers of connections and configurations to other devices and elements. By way of example only, the local area networks (LAN) 28 and the wide area network (WAN) 30 can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other bus types and links may be used, such as PCI.

Each of the client computing devices 12, servers 16 and the DNS servers 17 include a central processing unit (CPU) or processor, a memory, an interface device, and an I/O system, which are coupled together by a bus or other link, although other numbers and types of network devices could be used.

The client computing devices 12, in this example, may run interface applications, such as Web browsers, that may provide an interface to make requests to the global traffic manager computing device 14 and send content and/or data to different server based applications at servers 16 via the LANs 28 and/or WANs 30.

Generally, servers 16 process requests received from requesting client computing devices 12 via LANs 28 and/or WANs 30 according to the HTTP-based application RFC protocol or the CIFS or NFS protocol in this example, but the principles discussed herein are not limited to this example and can include other application protocols. A series of applications may run on the servers 16 that allow the transmission of data, such as a data file or metadata, requested by the client computing devices 12 or the global traffic manager computing device 14. The servers 16 may provide data or receive data in response to requests directed toward the respective applications on the servers 16 from the client computing devices 12. Additionally, the servers 17 can send queries or requests to the global traffic manager computing device 14. It is to be understood that the servers 16 may be hardware or software or may represent a system with multiple servers 16, which may include internal or external networks. In this example the servers 16 may be any version of Microsoft® IIS servers or Apache® servers, although other types of servers may be used. Further, additional servers may be coupled to the LAN 28 and many different types of applications may be available on servers coupled to the LAN 28.

Each of the DNS servers 17 can receive requests from the global traffic manager computing device 14 and can also send requests to the global traffic manager computing device 14 via WAN 30 according to the HTTP-based application RFC protocol or the CIFS or NFS protocol in this example, but the principles discussed herein are not limited to this example and can include other application protocols. Further, the DNS servers 17 can send requests to the global traffic manager computing device 14 requesting for information. The DNS servers 17 assist with translation or resolution of domain names and hostnames into corresponding numeric internet protocol address (IP) address format, although the DNS servers 17 can perform other functions. Additionally, the DNS servers 17 can recursively query other DNS servers 17 to answer a query.

Although an exemplary network environment 10 with the client computing devices 12, the global traffic manager computing device 14, servers 16, DNS servers 17, the LANs 28 and the WAN 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only tele-traffic in any suitable form (e.g., voice and modem), wireless traffic media, wireless traffic networks, cellular traffic networks, 3G traffic networks, Public Switched Telephone Network (PSTNs), Packet Data Networks (PDNs), the Internet, intranets, and combinations thereof.

The examples may also be embodied as a programmed instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for preventing distributed denial of service attack will now be described with reference to FIGS. 1-2. In step 205, the global traffic manager computing device 14 receives a request for accessing a DNS record from a device or DNS servers 17, although the global traffic manager computing device 14 can receive any other types of requests from any other types and numbers of devices. In this example, the requesting device can be the client computing device 12, one of the servers 16, one of the DNS servers 17, or from another global traffic manager, although the global traffic manager computing device 14 can receive requests from any other types and numbers of devices.

In step 210, the global traffic manager computing device 14 obtains network information in response to the request by querying the requesting device, although the global traffic management device 14 may obtain any other from the request device. By way of example only, the global traffic manager computing device 14 queries the requesting device to determine whether the requesting device is a client computing device 12, a server 16, a DNS server 17, or another global traffic manager computing device (not shown). Further, if the global traffic manager computing device 14 determines that the request is from a DNS server 17, the global traffic manager computing device 14 further determines if the requesting DNS server 17 supports recursive queries and zone transfers by querying the requesting DNS server 17. Further, the global traffic manager computing device 14 checks if the requesting DNS server 17 supports domain name system security extensions (DNSSec) and if the requesting DNS server 17 also supports exchanging of keys.

In step 215, the global traffic manager computing device 14 determines if there is enough of the network information to assign a rating or a score to the obtained network information. If the global traffic manager computing device 14 determines there is not enough network information to assign the rating, then a No branch is taken to step 220. By way of example, the global traffic manager computing device 14 determines if there is enough information based on type of received request, type of DNS record being requested to access, although the global traffic manager computing device 14 can determine using any other methods or techniques. In another example, the global traffic manager computing device 14 can determine if there is enough of the network information to assign a rating or a score based on parameters such as internet protocol (IP) address of the requesting device, the rate at which the global traffic manager computing device 14 receives the queries from the requesting device.

In step 220, the global traffic manager computing device 14 further queries the requesting device to obtain additional network information and the exemplary flow proceeds to step 225.

If back in step 215, the global traffic manager computing device 14 determines if there is enough of the network information to assign a rating or a score to the obtained network information, then the Yes branch is taken to step 225. In step 225, the global traffic manager computing device 14 saves all the network information obtained by querying the source of the received request in the memory 20, although the global traffic manager computing device 14 can save the obtained network information at other locations.

In step 230, the global traffic manager computing device 14 determines a rating or a score for the obtained network information. By way of example only, the global traffic manager computing device 14 determines the score based on a pre-determined weightage assigned to the obtained network information, although the global traffic manager computing device 14 can determine the rating or the score to each of the obtained network information using any other parameters or techniques. As it would be appreciated by a person having ordinary skill in the art, weightage in this example relates to a value assigned to the obtained network information indicating its importance. By way of example only, if one of the obtained network information is very important to determine a score or a rating, a higher weightage value is assigned to it and on the contrary, if the obtained network information is not of high importance, a lesser weightage value is assigned to the obtained network information.

In another example, the global traffic manager computing device 14 may use the historical information or active probing or monitoring information stored in the memory 20 based on previous interactions or communications with the requesting device to assign the score or the rating. Further, the global traffic manager computing device 14 may also assign a rating or score to the obtained network information for each subsequent request from the requesting device.

In step 235, the global traffic manager computing device 14 assigns the determined rating to the received request. As it would be appreciated by a person having ordinary skill in the art, assigning the determined rating to the received request particularly relates to assigning the determined rating by the global traffic manager computing device 14 to the internet protocol address (IP address) of the requesting device. By assigning the determined rating to the IP address to the requesting device by the global traffic manager computing device, the technology disclosed provides advantages of easily recognizing the requesting device which could potentially cause a DNS attack. In another example, the global traffic manager computing device 14 can assign the determined rating individually to each of the obtained network information and can determine the overall rating of the received request either by adding the individual rating assigned to each of the network information or by finding an average of the assigned ratings.

In step 240, the global traffic manager computing device 14 obtains a threshold rating. As it would be appreciated by a person having ordinary skill in the art, the threshold rating is the threshold above which the received request is safe to be forwarded to the DNS infrastructure or to respond directly. Optionally, in this example the threshold rating can be a range. By way of example only, the threshold rating is obtained by the global traffic manager computing device 14 using parameters such as type of received request, type of DNS record being requested to access, although the threshold rating can be obtained or otherwise defined using other parameters. In another example, the threshold rating can also be obtained by the global traffic manager computing device 14 using parameters such as internet protocol (IP) address of the requesting device, the rate at which the global traffic manager computing device 14 receives the queries from the requesting device.

In step 245, the global traffic manager computing device 14 compares the determined rating of the received request against the obtained threshold rating. If the global traffic manager computing device 14 determines that the determined rating is above the threshold rating, then the Yes branch is taken to step 250. In step 250, the global traffic manager computing device 14 responds to the request either by allowing the requests to the DNS infrastructure or by directly responding to the received request.

If the global traffic manager computing device 14 determines that the determined rating is equal to or below the threshold rating, then the No branch is taken to step 255. In step 255, the global traffic manager computing device 14 processes the requests to perform actions on the received request based on one or more classification policies. As it would be appreciated by person having ordinary skill in the art, in this technology, the classification policies exists for ranges below the threshold rating and the actions to be performed depends on these classification policies. Additionally, the global traffic manager computing device 14 assigns these classification policies to each section of the range in the threshold rating. By way of example only, the actions performed by the global traffic manager computing device 14 based on the classification policies includes mapping the requests to various rate classes, or performing quality of service (QoS) adjustments, or implementing a null routing to control or eliminating excess requests that could impair response times by resource consumption. Additionally, the global traffic manager computing device 14 may also perform automatic throttling adjustments at edge firewalls that support IF-MAP as a result of sites reaching a certain composite threshold. In step 260, this illustrative example of the method ends.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for mitigating distributed denial of service attacks executable by a system comprising one or more traffic manager computing devices, client devices and server devices across one or more networks, the method comprising steps to:
    obtain by a first processor network information relating to a received request from a requesting device, the obtained network information comprising a plurality of network parameters associated with the requesting device, wherein the obtaining further comprises determining when additional network information is required to assign a rating;
    determine by a second processor a rating for the network parameters based on an associated weight value when the additional network information is determined not to be required to assign the rating, wherein the network parameters are separately assigned with associated weight values;
    determine by a third processor an action to take with respect to the request based on a comparison of a determined rating and a threshold rating, wherein the determining further comprises assigning one or more classification policies to a section of a range in the threshold rating; and
    execute by a fourth processor a determined action comprising adjusting one or more quality of service parameters to a connection associated with the requesting device, wherein the quality of service parameters comprise one or more of an error rate, a bit rate, or a transmission delay.

2. The method as set forth in claim 1 further comprises employing at least one of the first, second, third, or the fourth processors on the one or more global traffic manager computing devices to obtain the additional network information when it is determined that additional network information is required to assign the rating.

3. The method as set forth in claim 1 wherein the determined action comprises employing at least one of the first, second, third, or the fourth processors on the one or more global traffic manager computing devices to respond to the request when the rating is greater than the threshold rating.

4. The method as set forth in claim 1 wherein the determined action comprises employing at least one of the first, second, third, or the fourth processors on the one or more global traffic manager computing devices to process the request based on one or more classification policy when the rating is lesser than the threshold rating.

5. The method as set forth in claim 1 further comprising employing at least one of the first, second, third, or the fourth processors on the one or more global traffic manager computing devices to assign the determined rating to the obtained network information.

6. A non-transitory computer readable medium having stored thereon instructions for preventing distributed denial of service attack comprising machine executable code which when executed by at least one processor, causes the processor to perform steps to and that comprise:
    obtain network information relating to a received request from a requesting device, the obtained network information comprising a plurality of network parameters associated with the requesting device, wherein the obtaining further comprises determining when additional network information is required to assign a rating;
    determine a rating for the network parameters based on an associated weight value when the additional network information is determined not to be required to assign the rating, wherein the network parameters are separately assigned with associated weight values;
    determine an action to take with respect to the request based on a comparison of a determined rating and a threshold rating, wherein the determining further comprises assigning one or more classification policies to a section of a range in the threshold rating; and
    execute a determined action comprising adjusting one or more quality of service parameters to a connection associated with the requesting device, wherein the quality of service parameters comprise one or more of an error rate, a bit rate, or a transmission delay.

7. The medium as set forth in claim 6 further comprises obtain the additional network information when it is determined that additional network information is required to assign the rating.

8. The medium as set forth in claim 6 wherein the determined action further comprises respond to the request when the rating is greater than the threshold rating.

9. The medium as set forth in claim 6 wherein the determined action further comprises process the request based on one or more classification policy when the rating is lesser than the threshold rating.

10. The medium as set forth in claim 6 further comprises assign the determined rating to the obtained network information.

11. One or more global traffic manager computing devices comprising:
at least one of configurable hardware logic configured to be capable of implementing and a processor coupled to a memory and configured to execute programmed instructions stored in the memory comprising step to:
obtain network information relating to a received request from a requesting device, the obtained network information comprising a plurality of network parameters associated with the requesting device, wherein the obtaining further comprises determining when additional network information is required to assign a rating;
determine a rating for the network parameters based on an associated weight value when the additional network information is determined not to be required to assign the rating, wherein the network parameters are separately assigned with associated weight values;
determine an action to take with respect to the request based on a comparison of a determined rating and a threshold rating, wherein the determining further comprises assigning one or more classification policies to a section of a range in the threshold rating; and
execute a determined action comprising adjusting one or more quality of service parameters to a connection associated with the requesting device, wherein the quality of service parameters comprise one or more of an error rate, a bit rate, or a transmission delay.

12. The device as set forth in claim 11 wherein at least one of the configurable hardware logic is further configured to be capable of implementing or the processor coupled to the memory is further configured to execute programmed instructions stored in the memory to and that comprise step to obtain the additional network information when it is determined that additional network information is required to assign the rating.

13. The device as set forth in claim 11 wherein at least one of the configurable hardware logic is further configured to be capable of implementing or the processor coupled to the memory is further configured to execute programmed instructions stored in the memory for the determined action to and that comprises step to respond to the request when the rating is greater than the threshold rating.

14. The device as set forth in claim 11 wherein at least one of the configurable hardware logic is further configured to be capable of implementing or the processor coupled to the memory is further configured to execute programmed instructions stored in the memory for the determined action to and that comprises step to process the request based on one or more classification policy when the rating is lesser than the threshold rating.

15. The device as set forth in claim 11 wherein at least one of the configurable hardware logic is further configured to be capable of implementing or the processor coupled to the memory is further configured to execute programmed instructions stored in the memory to and that comprise step to assign the determined rating to the obtained network information.

16. The method as set forth in claim 1 wherein the first processor, the second processor, the third processor, and the fourth processor are the same processor.

17. The method as set forth in claim 1 wherein at least one of the first processor, the second processor, the third processor, and the fourth processors are on the same computing device.

* * * * *